(12) United States Patent
Yano et al.

(10) Patent No.: US 9,076,600 B2
(45) Date of Patent: Jul. 7, 2015

(54) THIN FILM CAPACITOR

(71) Applicant: TDK Corporation, Chuo-ku, Tokyo (JP)

(72) Inventors: Yoshihiko Yano, Tokyo (JP); Tatsuo Namikawa, Tokyo (JP); Yasunobu Oikawa, Tokyo (JP)

(73) Assignee: TDK Corporation, Tokyo (JP)

( * ) Notice: Subject to any disclaimer, the term of this patent is extended or adjusted under 35 U.S.C. 154(b) by 92 days.

(21) Appl. No.: 13/796,986

(22) Filed: Mar. 12, 2013

(65) Prior Publication Data

US 2013/0258545 A1   Oct. 3, 2013

(30) Foreign Application Priority Data

Mar. 27, 2012 (JP) .................. 2012-070965

(51) Int. Cl.
```
H01G 4/30      (2006.01)
H01G 4/005     (2006.01)
H01G 4/228     (2006.01)
H01G 4/33      (2006.01)
H01G 4/38      (2006.01)
H01G 4/232     (2006.01)
```
(52) U.S. Cl.
CPC ............. *H01G 4/306* (2013.01); *H01G 4/33* (2013.01); *H01G 4/38* (2013.01); *H01G 4/232* (2013.01)

(58) Field of Classification Search
CPC ............ H01G 4/30; H01G 4/232; H01G 9/15
USPC .................... 361/301.4, 306.3, 303
See application file for complete search history.

(56) References Cited

U.S. PATENT DOCUMENTS

| | | | |
|---|---|---|---|
| 4,811,162 A | 3/1989 | Maher et al. | |
| 5,043,843 A | 8/1991 | Kimura et al. | |
| 5,312,581 A | 5/1994 | Amano et al. | |
| 5,712,758 A | 1/1998 | Amano et al. | |
| 5,774,326 A | 6/1998 | McConnelee et al. | |
| 6,118,647 A * | 9/2000 | Okinaka et al. | 361/305 |
| 6,254,971 B1 | 7/2001 | Katayose et al. | |
| 6,337,790 B1 | 1/2002 | Nellissen et al. | |
| 7,595,974 B2 * | 9/2009 | Nakano et al. | 361/321.4 |
| 2007/0064374 A1 | 3/2007 | Togashi et al. | |
| 2007/0074806 A1 | 4/2007 | Kojima et al. | |
| 2009/0067117 A1 * | 3/2009 | Kasuya et al. | 361/321.2 |

FOREIGN PATENT DOCUMENTS

JP          11-026290 A     1/1999

OTHER PUBLICATIONS

Yasunoba Yoneda, et al., Preparation and Characterization of Ultra Thin Chip Capacitor, CARTS Europe 2006 Proceedings, Sep. 25-28, 2006, pp. 273-280, 20th annual passive components symposium, Bad Homburg, Germany.

* cited by examiner

*Primary Examiner* — Eric Thomas
*Assistant Examiner* — Arun Ramaswamy
(74) *Attorney, Agent, or Firm* — Posz Law Group, PLC

(57) ABSTRACT

A thin film capacitor includes two or more of dielectric body layers that are alternately laminated on an under-electrode, and internal electrode layers that are laminated between the dielectric body layers, and are exposed off the dielectric body layer, and a connection electrode that is electrically connected to the internal electrode layers via the exposed portion of the internal electrode layers, A relationship between an average grain size D of crystal grains in the internal electrode layers and an average grain size d of crystal grains in the connection electrode is D>d.

7 Claims, 3 Drawing Sheets

Fig. 1A
Fig. 1B
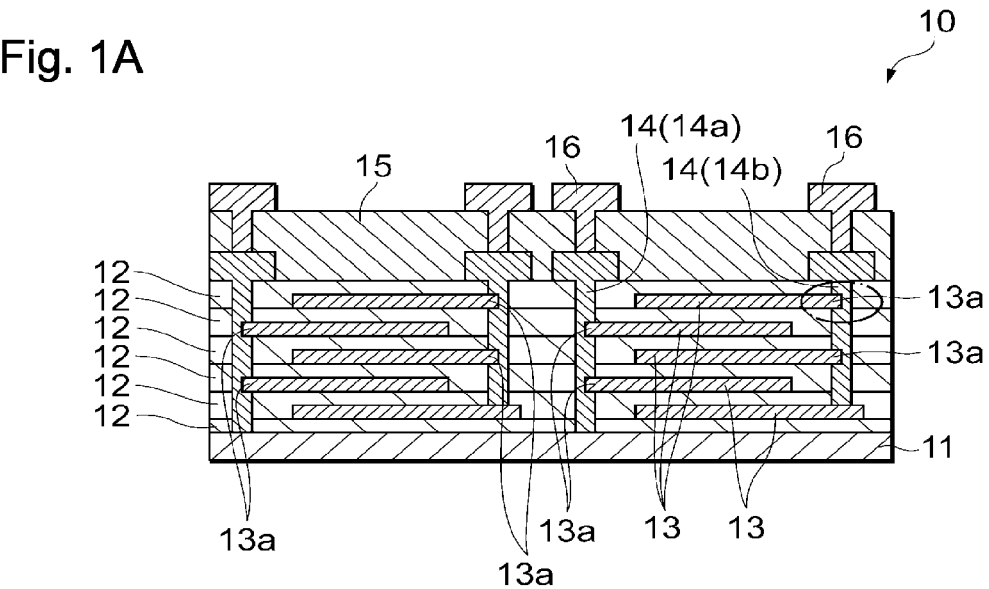
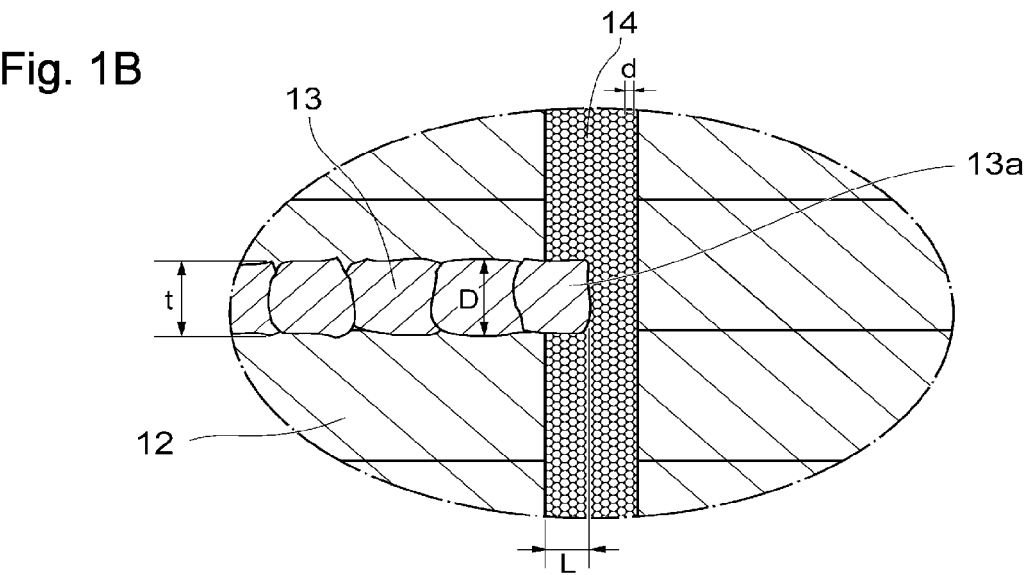

THIN FILM CAPACITOR

TECHNICAL FIELD

The present invention relates to a thin film capacitor.

BACKGROUND

For example, like thin film capacitors described in patent and non patent documents below, dielectric body layers and internal electrode layers that are alternately laminated to form a multilayer body constituting multiple layers, and configuration where a portion of this multilayer body is exposed and where a plurality of internal electrode layers are bundled as an electrode are known,

PRIOR ART DOCUMENTS

Patent document 1: Japanese Patent Application Laid-Open No. H11-26290
Non patent document 1: CARTS Europe 2006 Proceeding pp 273-280

However, it is believed that the configuration of the thin film capacitor described in Patent Literature 1 and Non-Patent Literature 1 where a multilayer structure has been adopted in order to realize larger capacity of the thin film capacitor has the following problems. In the case of the thin film capacitor, patterning is conducted using techniques, such as forming slits using dicing or forming slits, via-boles or through-holes by ion milling using photolithography to expose internal electrode layers to sides of dielectric body layers, and the internal electrode layers and connection electrodes (external electrodes) are connected via this exposed portion, respectively. However, with this method, not only the process becomes complicated, but only an end surface portion of the internal electrode with very thin film thickness shall be exposed, and because only this end surface portion shall be connected to the connection electrode, the connection state (electric connection) between the internal electrode layers and the connection electrodes easily becomes unstable. Consequently, there are problems where a capacity of elements varies due to internal electrode layers not being connected, and resistance of the electrodes, i.e., equivalent series resistance (ESR) is increased.

The present invention has been accomplished by taking the problems above into consideration, and has an object to provide a thin film capacitor that can improve the stability of the electric connection between the internal electrode layers and the connection electrode.

SUMMARY

In order to solve at least one of the problems, a thin film capacitor includes two or more of dielectric body layers that are alternately laminated on an under -electrode, and internal electrode layers that are laminated between the dielectric body layers, and are exposed off the dielectric body layer, and a connection electrode that is electrically connected to the internal electrode layers via the exposed portion of the internal electrode layers. A relationship between an average grain size D of crystal grains in the internal electrode layers and an average grain size d of crystal grains in the connection electrode is D>d.

According to such thin film capacitor, crystal grains of the internal electrode layers are in a range for enabling preferable connection with the connection electrode, and the connection state between the internal electrode layers and the connection electrodes can he stabilized. If the crystal grains of both the internal electrode layers and the connection electrodes are large, the connection state becomes unstable. Based upon this result, it has become possible to improve the stability of the electric connection between the internal electrode layers and the connection electrodes. Then, if the stability of the connection status is improved, effects, such as yield of products becoming excellent, variation of element capacities becoming improved, an increase in ESR enabling restraint and/or reliability becoming improved, can be obtained.

In the thin film capacitor of the present invention, the exposed internal electrode layers preferably include a protrusion part that protrudes from the dielectric body layer as seen in a lamination direction. It is preferred that the connection electrode is electrically connected to the internal electrode layers via at least a portion of a surface of and an end surface of each of the internal electrode layers, the portion and the end being included in the protrusion part. The protrusion parts can further enlarge the contact areas of both, and can further stabilize the connection status.

In the thin film capacitor of the present invention, it is preferable that the connection electrode has at least an Ni region and an Ni alloy region, and a relationship of average grain size 'd' of the crystal grains of the connection electrode in the region is preferably D>d.

In addition, in the thin film capacitor of the present invention, an under-electrode is preferably Ni foil. If the Ni foil is used for the under-electrode, when a thermal treatment is conducted after the internal electrode layers and the dielectric body layers are laminated and the grain size is controlled, cracks and peeling are hard to occur in the multilayer body, and the crystal grains of the internal electrode layers and the connection electrode can be the most-suitable value. Therefore, the connectivity can be further increased.

According to the thin film capacitor relating to the present invention, it becomes possible to improve the stability of the electric connection between the internal electrode layers and the connection electrode.

BRIEF DESCRIPTION OF THE DRAWINGS

FIG. 1A is a schematic cross-sectional view showing a structure of a thin film capacitor relating to one embodiment (first embodiment) of the present invention,
FIG. 1B is a partially enlarged view of the thin film capacitor shown in FIG. 1A,
FIGS. 2A-2F are schematic cross-sectional views showing a manufacturing method for the thin film capacitor relating to one embodiment of the present invention.

DETAILED DESCRIPTION

Figure 2A:
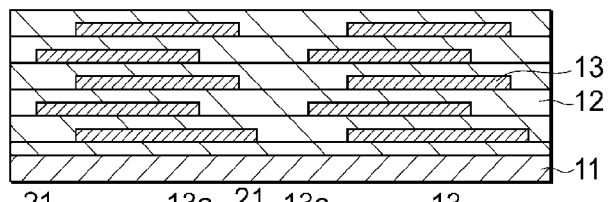

Hereafter, preferred embodiments are explained, provided, however, that the present invention shall not be limited to the embodiments below, Furthermore, the same or similar elements are marked with the same symbols, and if a description is redundant, the description will be omitted,
FIG. 1A is a schematic cross-sectional view showing a structure of a thin film capacitor 10 relating to a first embodiment of the present invention. In this drawing, two elements are shown, in actuality, the thin film capacitor 10 is manufactured as an aggregate of many elements and is formed in an element by singulation, such as dicing. As shown in FIG. 1A, the thin film capacitor 10 is constructed by including an under-electrode 11, two or more dielectric body layers 12 laminated onto this under-electrode 11, internal electrode layers 13 laminated in between the dielectric body layers, connection electrode 14 that are electrically connected to the internal electrode layers 13, respectively, a passivation film 15 as a surface protective film and terminal electrodes 16.

The dielectric body layers 12 and the internal electrode layers 13 are alternately laminated and form a multilayer body. Furthermore, in FIG. 1A, a lamination state of the dielectric body layers 12 and the internal electrode layers 13 is simplified by using six layers of the dielectric body layers 12 and five layers of the internal electrode layers 13, but in the thin film capacitor 10 of the present embodiment, a multilayer body can be formed with hundreds of layers of the dielectric body layers 12 and the internal electrode layers 13.

The present embodiment shows one example of a case where the exposed internal electrode layer 13 protrudes from the dielectric body layer 12. Furthermore, "exposure" in the present invention indicates a state where the internal electrode layer 13 is not covered with at least the dielectric body layer 12, and "protrusion" indicates a state where the internal electrode layer 13 protrudes at least from the surface of the dielectric body layer 12. As shown in FIG. 1B, the internal electrode layer 13 has a protrusion part 13a that protrudes from the dielectric body layer 12 toward the connection electrode 14 viewing from the lamination direction. The connection electrode 14 is electrically connected to the internal electrode layer 13 via a surface and an end surface of the internal electrode layer included in the protrusion part 13a of this internal electrode layer 13. Then, particularly in the present embodiment, the internal electrode layer 13 is configured so as to fulfill the following conditions. In other words, the size of crystal grains in the internal electrode layer 13, i.e., the average grain size 'D' and size of crystal grains in the connection electrode 14, i.e., the average grain size 'd' fulfills the following conditional expression (1):

$$D > d \qquad (1)$$

Since the internal electrode layers 13 are sintered after the internal electrode layers 13 and the dielectric body layers 12 are laminated, the internal electrode layers 13 have received a high temperature treatment and crystal grains greatly grow. At this time, if the above-described 'd' is equal to 'D', an excellent connection becomes difficult. This is because of the reason below. When crystal grains grow, unevenness occurs to the internal electrode layers 13 and the connection electrode 14 due to a difference between surface free energy on the crystal surface and free energy of crystal grains in the crystal grain boundary. Due to the unevenness occurrence both in the internal electrode layers 13 and in the connection electrodes 14, it is believed that a connection area that is sufficient for stabilization of the electric connection cannot be secured, and the connection status becomes unstable. In the meantime, if the crystal grain size 'd' becomes smaller than 'D' even a little, the unevenness tends to be reduced, and a sufficient connection area can be secured and certainty of connectivity is enhanced.

Furthermore, according to this principle, although with a combination of an electrode with large crystal grains and another electrode with small crystal grains, a wraparound can be expected at the boundary of both, it is necessary to be not D<d but D>d in the case of a thin film capacitor. In general, for a characteristic of a capacitor, low ESR is required. In particular, in the case of a thin film capacitor with laminated multiple layers, lowering a resistance value for a thin internal electrode is the most effective for lowering ESR. In order to do so, it is necessary to increase the size of the crystal grains in the internal electrode in size. If the crystal grains are small, a large amount of electric current flowing there has to cross the crystal grain boundary, and a resistance value rises. As the internal electrode for a thin film capacitor laminated to be multiple layers, because the film thickness is thin at 100 nm to 1,000 nm, it is possible to remarkably lower the resistance value in the electrode with large crystal grains and it is preferable as an internal electrode.

In addition, as another capacitor characteristic, there is insulation resistance (IR). In an ideal capacitor, although a resistance value between electrodes is infinite, since a dielectric body layer between the internal electrodes is not a complete insulator, if a direct voltage is applied, a minute electric current flows. In the case of a thin internal electrode, such as a thin film laminated capacitor, it is preferable to increase the size of the larger crystal grains because the IR becomes greater. Especially in the case of an internal electrode using a Ni material, this effect is remarkable. If the internal electrode is composed of large crystal grains, an interface state at a boundary of the internal electrode and the dielectric body layer is stably formed, and because of this dielectric body layer, a depletion layer is formed in the dielectric body layer. Due to this, a Schottky barrier is stably formed, and the IR becomes higher. Thus, it is preferable that the crystal grains of the internal electrode are larger as a thin film laminated capacitor and preferably approximately 100 to 1,000 nm.

When the crystal grain size 'D' of the internal electrode layer 13 is increased because of such reasons, if the crystal grain size 'd' of the connection electrode 14 is greater than that, i.e., D<d, because of the structure where the internal electrode layer 13 is formed first, the crystal grains of the connection electrode 14 cannot sufficiently wrap around with regard to the unevenness of the crystal grains in the internal electrode layer 13, causing that connection stability cannot be sufficiently secured. In the meantime, if the crystal grain size 'd' of the connection electrode 14 is smaller, i.e., there is a relationship of D>d, the crystal grains in the connection electrode 14 can sufficiently wrap around along the unevenness of the crystal grains in the inner electrode 13, and it also becomes possible to enter into a portion of the concave part of the crystal grains in the internal electrode layer 13. Furthermore, if the relationship of D>d holds at least one layer out of a plurality of internal electrode layers, the effect of the present invention can be obtained in that layer, but it is preferable that all internal electrode layers, substantially 80% or more of layers are in this relationship.

The thickness of the internal electrode layer is preferably 300 nm to 500 nm; and therefore, the grain size 'D' of the internal electrode is substantially the same as that of the electrode at 300 nm to 500 nm. It is preferable that 'd' that is suitable to this 'D' is at 30 nm to 50 nm. According to the mechanism above, the range of D/d is preferably 2 to 100. If D/d is within the range of smaller than 2, the connection electrode cannot sufficiently enter in between the crystal grains of the internal electrode, causing the connection electrode between the internal electrode and the connection electrode to be increased. In the meantime, if D/d becomes greater than 100, many grain boundaries shall exist, and then, the resistance is still increased. Therefore, in the structure of the thin film capacitor of the present invention where $2 \leq D/d \leq 100$, preferably $5 \leq D/d \leq 20$, it is possible to lower the resistance of the electrodes the most, and it is preferable.

The internal electrode layer 13 is preferably configured with an inexpensive base metal material as a main component for the purpose of cost reduction, and it is particularly preferable to be configured with Ni as a main component. Furthermore, the internal electrode layer 13 can be made by using at least one of, for example, Ni, Pt, Pd, Ir, Ru, Rh, Re, Os, Au, Ag, Cu, IrO2, RuO2, SrRuO3 and LaNiO3. The thickness of the internal electrode layer 13 is preferably 100 to 1,000 nm. The average size of crystal grains is approximately 100 to 1,000 nm to form a preferred internal electrode as a capacitor. Herein, the internal electrode to be configured by using Ni as a main component is preferable because the crystal grains can be easily controlled. Particularly the crystal grains with Ni are preferable because they can be controlled. With the internal electrode using noble metal, such as Pt, it is difficult to increase the size of the crystal grains. Further, with that using Cu, it is difficult to control the size of the crystal grains because Cu excessively grows in size.

In the protrusion part 13a of the internal electrode layer 13, a direction to protrude from the dielectric body layer 12 viewing from the lamination direction is either of two directions, and one is a protruding direction of odd-numbered internal electrode layers, such as the 1st, 3rd . . . , from the under-electrode side, and the other is a protruding direction of even-numbered internal electrode layers, such as the 2nd, 4th . . . , from the under-electrode side. Then, due to these two directions, any of a pair of connection electrodes 14 are connected. In other words, one of the connection electrodes 14 (14a of FIG. 1A) is connected to the under-electrode 11 and the 2nd, 4th . . . internal electrode layers 13 from the lower side. The other connection electrode 14 (14b of FIG. 1A) is connected to the 1st, 3rd, 5th . . . internal electrode layers 13 from the lower side.

When the protruding distance of the protrusion part 13a of the internal electrode layer 13 toward the dielectric body layer 12 is regarded as 'L' and the thickness of the internal electrode layer 13 is regarded as 't', a ratio of these satisfies the following conditional expression (2):

$$0.5 \leq L/t \leq 120 \qquad (2)$$

Furthermore, the protruding distance of the protrusion part 13a means maximum distance of a portion where the protrusion part 13a makes contact with (is connected to) the connection electrode 14. With such construction, the protruding distance of the protrusion part appropriately ranges so as to suitably connect to the connection electrode, and the connection status between the internal electrode layers 13 and the connection electrodes 14 can be further stabilized. As a result, it becomes possible to improve the stability of the electric connection between the internal electrode layers 13 and the connection electrodes 14. Then, if the stability of the connection status is improved, yield of products becomes better and the reliability is also improved. Regarding the lower limit value ($0.5 \leq L/t$) of this conditional expression, the effect of further stabilization of the connection status by placing the protrusion part 13a cannot be sufficiently obtained. Further, regarding the upper limit value ($L/t \leq 120$) of this conditional expression, if the protruding distance of the protrusion part 13a is too great, on the occasion of forming the connection electrode 14, it becomes difficult for a connection electrode material to enter into between the protrusion parts 13a of the adjacent internal electrode layers 13, and a chemical at the time of manufacturing easily remains. Then, a possibility to cause deterioration of insulating resistance of a manufactured thin film capacitor becomes higher due to invasion of humidity caused by the residual chemical, and then, there is a possibility to lower the reliability, The connection electrode 14 may be made of an inexpensive base metal material, such as Cu, but one configured by using Ni, Pt, Pd, Ir, Ru, Rh, Re, Os, Au, Ag or Ir at least in a portion is preferable, and one constructed by using Ni as a main component is particularly preferable. Inexpensive base metal, such as Cu, easily damages the internal electrode layers 13 and the dielectric body layer 12 due to passage of oxygen in the connection region, and the connectivity may also become poor. Depending upon the required reliability, such base metal may not be able to be used. Furthermore, the connection electrode 14 can have a multi-layer structure, for example, with Ni/Cu. In this case, a method to ensure connection stability in the Ni layer and to supplement the conductivity at the Cu side is particularly preferable. In any event, configuration using Ni, Pt, Pd, Ir, Ru, Rh, Re, Os, Au, Ag or Ir at least in a portion as a main component is preferable, and the configuration using Ni at least in a portion as a main component is particularly preferable. In other words, it is preferable that the connection electrode 14 has at least an Ni region or an Ni alloy region, and the relationship of the average grain size 'd' of the crystal grains in the connection electrode 14 in this region is D>d. Because of the above reasons, the relationship between the average crystal grain size of the layer configured containing Ni, Pt, Pd, Ir, Ru, Rh, Re, Os, Au, Ag Ir as a main component in at least a portion and the grain size 'D' of the internal electrode layer 13 is preferably $2 \leq D/d \leq 100$, is more preferably $5 \leq D/d \leq 20$.

In addition, in the case of the structure where the internal electrode layer 13 has the protrusion part 13a, from a viewpoint to prevent grains wrapping around under the protrusion part 13a from making one-point contact at least, the protruding distance $L/2d \geq 1$ is particularly preferable. Setting in this range enables stable connection, and particularly lowering of ESR.

The under-electrode 11 can be configured so as to contain, for example, at least one of Ni, Pt, Pd, Ir, Ru, Rh, Re, Os, Au, Ag, Cu, IrO2, RuO2, SRuO3 and LaNiO3. The film thickness of the under-electrode 11 is preferably 50 to 2,000 nm. Further, the under-electrode 11 and a substrate can be configured with the same material. In such case, due to cost reduction, ones containing inexpensive base metal, such as Ni, Cu or Al; its alloy as a main component; stainless steel or Inconel® are preferable, and Ni foil is particularly preferable. The film thickness in the case of using the same material for the under-electrode 11 and the substrate is preferably 5 to 500 nm. In the present embodiment, the Ni foil is used for the under-electrode 11, and this combines a function as a retainer member to retain the dielectric body layer 12 and another function as a substrate to form the dielectric body layer 12. In addition, if the Ni foil is used, in the case of sintering after laminating the internal electrode layers 13 and the dielectric body layers 12, a crack or peel-off hardly occurs to the multilayer body. Thus, the under-electrode 11 relating to the present embodiment preferably has configuration to double as a substrate, such as a metal foil, and as an electrode. However, a structure with substrate/electrode film including a substrate made of Si or alumina and a substrate made of a metal film may be used as the under-electrode 11.

For the dielectric body layer 12, perovskite oxides, such as BT, i.e. barium titanate: BaTiO3; BST, i.e. barium strontium titanate: (BaSr)TiO3; ST, i.e. strontium titanate: SrTiO3; CZ, i.e. calcium zirconate: CaZrO3; (BaSr)(TiZr)O3,BaTiZrO3 and the like, are preferably used. The dielectric body layer 12 can contain one or more of these oxides. The film thickness of the dielectric body layer 12 is preferably approximately 100 to 1,000 nm.

The passivation film 15 may be made of an insulating resin, such as polyimide resin, epoxy resin, phenol resin, heuzocyclobutene resin, polyimide resin or fluorine contained resin.

The terminal electrode 16 is preferably configured by containing Cu as a main component. Furthermore, a layer(s) of Au, Sn, Pd and the like may be established in the external layer of the terminal electrode 16.

Next, with reference to FIGS. 2A to 2F, a method for manufacturing the thin film capacitor 10 is explained. However, the present invention is limited to the manufacturing method below. Furthermore, as similar to FIG. 1A, although two elements are shown in this drawing, in actuality, the thin film capacitor 10 is manufactured as an aggregate of many elements, and it is singulated by cutting and elements are obtained.

At first, as shown in FIG. 2A, film formation of the dielectric body layers 12 and film formation of the internal electrode layers 13 using a mask are alternately repeated on the under-electrode 11, and a multilayer body is formed. At this time, for the internal electrode layers 13, the films are formed using a mask so as to alternately move the film formation position at predetermined amplitude per layer.

Figure 2B:
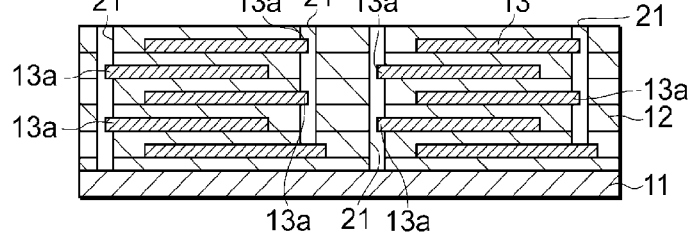
Figure 2C:
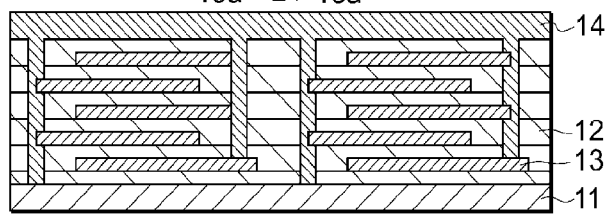
Figure 2D:
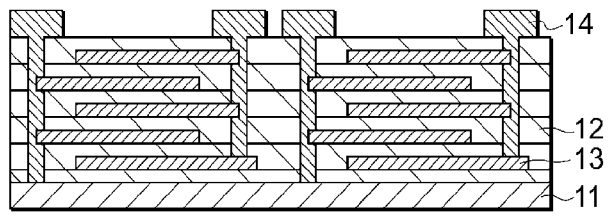
Figure 2E:
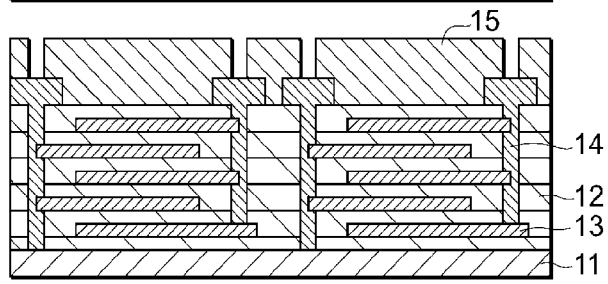

Next, after a thermal treatment, as shown in FIG. 2B, wet etching is applied from the surface position at the opposite side of the under-electrode 11 in the multilayer body so as to expose the protrusion parts 13a of the internal electrode layers 13, and openings 21 are formed. At this time, etching liquid (etchant) that etches a dielectric body but does not etch an electrode layer is used. Specifically, for example, when the dielectric body film is BT, BST or ST, a preferred etchant is a hydrochloric acid+ammonium fluoride solution. Further, when the dielectric body film is CZ, the preferred etchant is a sulfuric acid+ammonium fluoride solution. Herein, protruding distance L of the protrusion part 13a exposed to the opening 21 by wet etching means maximum length of the protrusion part 13a in the opening 21.

Furthermore, before the wet etching, for example, slits are added by dicing, or slits, via-holes or through-holes are formed by ion milling for exposing an end surface of the internal electrode layer 13. Because erosion of the dielectric body layer by a wet etching treatment becomes consistent due to this [step], it becomes possible to even out the protruding distance of the protrusion parts 13a of the internal electrode layers 13, and variation of the performance in the thin film capacitor is controlled and reliability is further improved. Further, the opening is not a hole-state, but an outer slit.

Next, as shown in FIG. 2B, a connection layer is formed in the openings 21. For example, a film is formed throughout the entire surfaces and end surfaces of the protrusion parts 13a of the internal electrode layers 13 along the inner walls of the openings so as not to cause any voids, by sputtering. In particular, since a sputtered Ni film can easily be a film with minute grain size, the grain size is easily controlled by a thermal treatment, and it is preferable. Further, other coating methods, such as paste printing or application, can be used other than sputtering. Herein, the connection layer is configured so as to have a relationship between the average grain size 'D' of the crystal grains in the internal electrode layers 13 and the average grain size 'd' orf the crystal grains in the connection electrode 14 to be D>d.

Figure 2F:
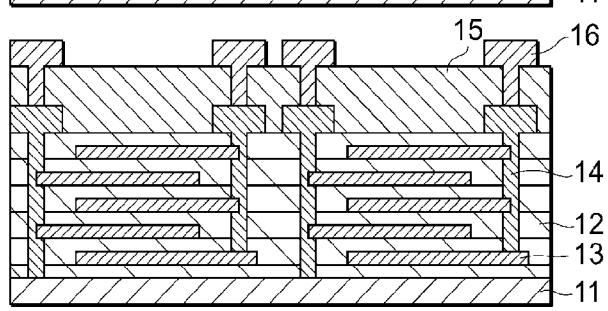

Then, the connection electrode 14 is molded by patterning (FIG. 2D) and the passivation film 15 is formed if necessary (FIG. 2E), and the terminal electrode 16 is further formed so as to connect to the connection electrode 14 by seed film formation and plating treatment (FIG. 2F).

Thus, according to the thin film capacitor 10 relating to the present embodiment, because the internal electrode layers 13 and the connection electrodes 14 are connected via at least a part of the surface and end surfaces of the internal electrode layers 13 contained in the protrusion parts 13a of the internal electrode layers 13, a contact area of both can be increased, and the connection status can be stabilized. In addition, because of realizing a relationship between the average grain size 'D' of the crystal grains in the internal electrode layers 13 and the average grain size 'd' of the crystal grains in the connection electrode 14 to be D>d, the crystal grains in the internal electrode layers 13 appropriately range so as to enable preferable connection with the connection electrode 14, and the connection status between the internal electrode layers 13 and the connection electrode 14 can be further stabilized. As a result, it becomes possible to improve the electric connection between the internal electrode layers 13 and the connection electrode 14. Then, when the connection status is stabilized, product yield is improved and the reliability is also improved.

Figure 3A:
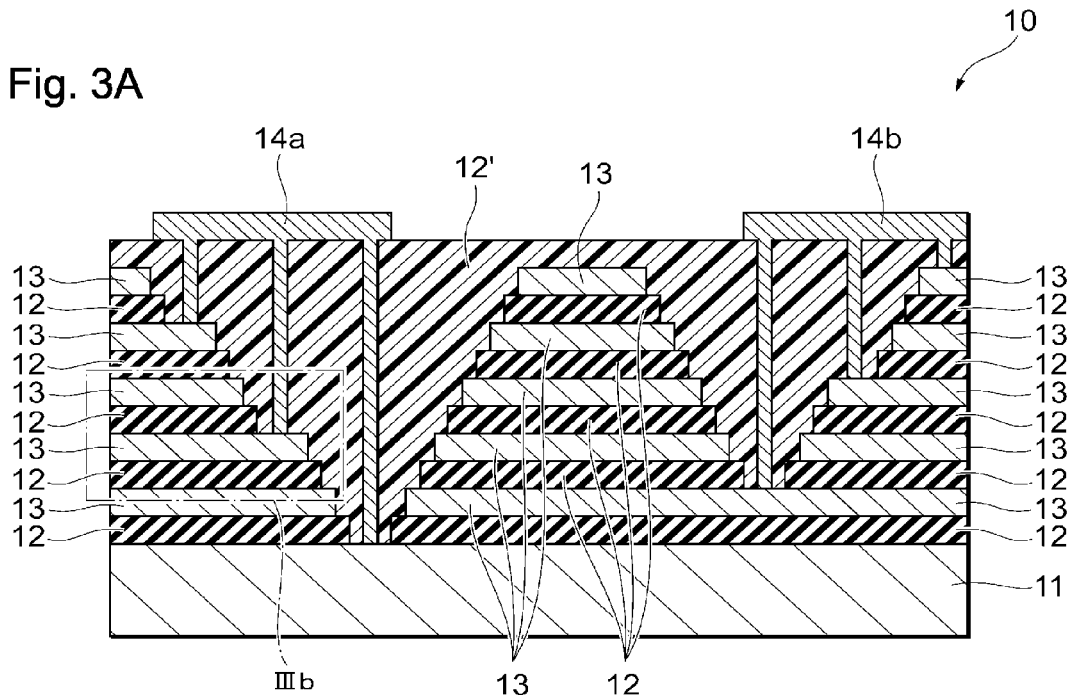
FIG. 3A is a schematic cross-sectional view showing a structure of a thin film capacitor relating to another embodiment (second embodiment) of the present invention.

FIG. 3A is a schematic cross-sectional diagram showing a structure of the thin film capacitor relating to another embodiment of the present invention, i.e., a second embodiment. The thin film capacitor 10 of the present embodiment is configured by including the under-electrode 11, two or more dielectric body layers laminated on this under-electrode 11, the internal electrode layers 13 laminated in between the dielectric body layers, another dielectric body 12' formed so as to cover the dielectric body layers 12 and the internal electrode layers 13, and the connection electrodes 14 (14a and 14b) are electrically connected to the internal electrode layers 13. Further, other than these, similar to the first embodiment, the passivation film 15 as a surface protective film and/or the terminal electrode 16 (not shown) can be established.

Figure 3B:
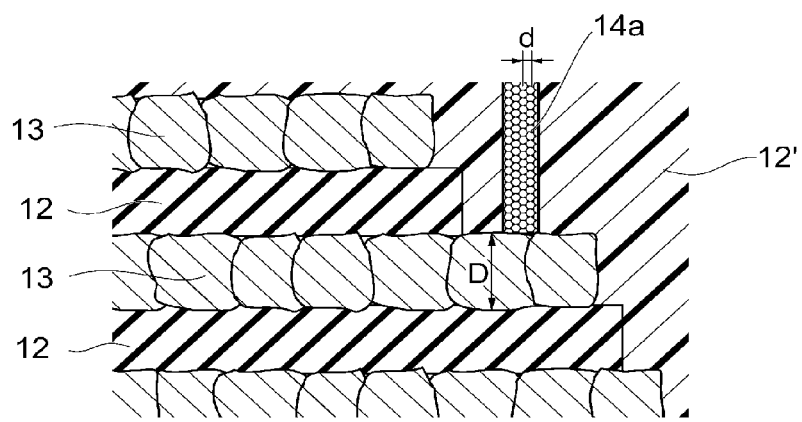
FIG. 3B is a partially enlarged view of the thin film capacitor shown in FIG. 3A.

As shown in FIG. 3A, in the thin film capacitor 10 of the present embodiment, a multilayer body is formed by alternately laminating the dielectric body layers 12 and the internal electrode layers 13, and the internal electrode layers 13 are electrically connected to the connection electrodes 14 via portions exposed from the dielectric body layers 12. Specifically, surfaces of the internal electrode layers 13 are exposed from the dielectric body layers 12 viewing from the lamination direction, and the connection electrodes 14 are connected to these exposed surfaces. Then, the internal electrode layers 13 are configured so as to satisfy the condition below, in other words, as shown in FIG. 3B, size of the crystal grains in the internal electrode layers 13, i.e. the average grain size 'D' and the size of the crystal gains in the connection electrode 14, i.e. the average grain size 'd' satisfy the following conditional expression (1):

$$D>d \qquad (1)$$

Although the internal electrode layer 13 of the present embodiment does not include the protrusion part 13 unlike the first embodiment, according to the similar function as the first embodiment, even in the case of exposure part on the surface instead of the connection part with the connection electrode 14, the similar function as the first embodiment can be obtained.

Thus, the preferred embodiments of the present invention were explained, but the present invention shall not be limited to the embodiments above. For example, in the first embodiment, another structure where the protrusion parts 13a are not established, but only end surfaces (sides) of the internal electrode layers 13 are exposed from the dielectric body layers 12 is acceptable. Even in this case, the functional effect above can be obtained between the internal electrode layers and the connection electrode 14.

EXAMPLES

Hereafter, the present invention is further specifically explained with reference to embodiments. However, the present invention shall not be limited to the embodiments below.

Examples 1 to 10

Thin film capacitors with the similar structure to FIG. 1 were manufactured. The dielectric body layers 12 and the patterned internal electrode layers 13 were alternately laminated onto the Ni foil under-electrode 11 by sputtering. BT was used for the dielectric body layer 12. The thickness of the internal electrode layers was set at 300 nm for Examples 1 to 3, 400 nm for Example 4, 200 rim for Example 5, 100 nm for Example 7, and 500 nm for Examples 8 and 9. Eleven layers of the dielectric body layers 12 were laminated. Due to this, the number of the dielectric body layers 12 sandwiched between the Ni foil under-electrode 11 and the internal electrode layers 13 becomes 10. Electrode shape and dielectric body thickness were set so as to he approximately 5,500 pF (5.5 nF) of one layer of dielectric body layer 12.

After the dielectric body layers 12 and the internal electrode layers 13 were laminated, a resist layer having the openings 21 was formed on a thermally-treated aggregate at a position enabling the connection with the internal electrodes. Then, the dielectric body layers 12 at the openings 21 were etched with etching liquid. For the etching liquid at this time, a hydrochloric acid +ammonium fluoride solution was used. Due to this etching, the dielectric body layers 12 at the openings 21 were removed, and, the protrusion parts 13a were formed by realizing the situation where the end portions of the internal electrode layers 13 protruding from the side wall of the dielectric body layers 12 at the openings 21. The protruding distance L was set at 2 μm. Then, after the resist layer was peeled off and a thermal treatment was applied again, an Ni film was formed by sputtering as a conductor layer for connection (connection electrode 14) at the openings of the aggregate, four levels at various temperatures, i.e. no thermal treatment for Examples 1, 9 and 10, at 200° C. for Example 2, at 400° C., for Examples 3, 4 and 5 and at 700° C. for Examples 6, 7 and 8 were applied, crystal grain size was controlled. In addition, the passivation film 15 was formed and the terminal electrode 16 was further formed.

Using such technique, 20 each of thin film capacitors were manufactured. ESR and capacitance were measured in these thin film capacitors, and mean average values were calculated, Regarding the capacitance, its standard deviation was calculated. In addition, the connection conductor layer (connection electrode 14) and the internal electrode layers 13 were cut by focused ion beam (FIB), and ten crystal grain sizes were measured at random in the internal electrode layer 13 and the connection conductor layer (connection electrode 4) using a scanning electron microscope (SIM), respectively. For the measurement, an area of the cross section in one crystal grain was converted into diameter equivalent to a circle, and this was implemented to cross sections of 10 grains closer to the connection conductor layer (connection electrode 14) for the internal electrode layers 13, and cross sections of 10 grains making contact with or in the vicinity of the internal electrode layers 13 for the connection conductor layer (connection electrode 14), and an average value was obtained, respectively, and they were deemed as the average grain size.

Example 11

The thin film capacitors 10 were manufactured as similar to Example 3, and the connection conductor layer (connection electrode 14) was made of Ni nanoparticles at the openings of the aggregate. Capacitance and ESR of the capacitors were measured as similar to Example 3, and regarding the capacitance, its mean value and standard deviation were calculated. In addition, the connection conductor layer (connection electrode 14) and the internal electrode layers 13 were cut by FIB, and as similar to the examples above, 10 crystal grain sizes were measured at random. For the measurement, an area of the cross section of one crystal grain was converted to a diameter of circle equivalent, and this was implemented to cross sections of 10 crystal grains at random and an average was obtained, and each was deemed as the average grain size.

Example 12

The thin film capacitors 10 were manufactured as similar to Example 2, and after Ni (film thickness: 100 nm) and Cu (5 μm) were formed to be multiple layers by sputtering as the conductor layer for connection (connection electrode 14) at the openings of the aggregate, a thermal treatment at 200° C. was applied. Ni was set thin at 100 nm so as not to grow large grains. As similar to Example 1, capacitance and ESR of the capacitor were measured, and for the capacitance, its mean value and standard deviation were calculated. in addition, Ni portions of the protrusion parts 13a of the connection conductor layer (connection electrode 14) and the internal electrode layers 13 were cut by FIB, and as similar to the examples above, the size of 10 each of crystal grains were measured at random. For the measurement, an area of the cross section of one crystal grain was converted to a diameter of circle equivalent, and this was implemented to cross sections of 10 crystal grains at random and an average was obtained, and each was deemed as the average grain size.

Examples 13 to 22

As similar to Example 1, the thin film capacitors were manufactured. However, the thickness of the internal electrode layers was set at 100 nm for Example 17, 500 nm for Examples 14 and 22 and 300 nm for others. After the dielectric body layers 12 and the internal electrode layers 13 were laminated, a resist layer having the openings 21 was formed on the thermally-treated aggregate at a position enabling the connection with the internal electrodes. Then, the dielectric body layers 12 at the openings 21 were etched with etching liquid. For the etching liquid at this time, a hydrochloride acid+ammonium floride solution was used. Due to this etching, the dielectric body layers 12 at the openings 21 were removed, and, the protrusion parts 13a were formed by realizing the state where end parts of the internal electrode layers 13 protruding from the side walls of the dielectric body layers 12 at the openings 21. The protruding distance L varied at four levels. In other words, it was set at 5 nm for Examples 13 and 14, 50 nm for Examples 15, 16 and 17, 30 nm for Examples 18 and 21 and 2 μm for Example 22. Then, after the resist layer was peeled off and the thermal treatment was applied again, an Ni film was formed at the openings of the aggregate as the connection conductor layer (connection electrode 14) by sputtering, and the thermal treatment was applied at various temperatures, i.e., no thermal treatment for Examples 13 and 18, at 200° C., for Examples 14, 15 and 19, 400° C. for Examples 16 and 20, and at 600° C. for Examples 17, 21 and 22, and crystal grain size was controlled. In addition, the passivation film 15 was formed, and the terminal electrode 16 was further formed. As similar to Example 1, capacitance and ESR of the capacitors were measured, and for the capacitance, its mean value and standard deviation were calculated.

In addition, the Ni portions of the protrusion parts 13a of the connection conductor layer (connection electrode 14) and the internal electrode layers 13 were cut by FIB, and as similar to the embodiments above, 10 each of crystal grain size was measured at random. For the measurement, an area of the cross section of one crystal grain was converted to a diameter of circle equivalent, and this was implemented to cross sections of 10 crystal grains at random and an average was obtained, and each was deemed as the average grain size.

Comparative Examples 1 to 3

Thin film capacitors were manufactured as similar to Example 1, and an Ni film was formed as the connection conductor layer (connection electrode 14) at the openings of the aggregate by sputtering at 300 nm for Comparative Example 1, at 100 nm for Comparative Example 2 and 500 nm for Comparative Example 3. Then, by matching with the paste thermal treatment temperature where connection becomes certain with a laminated ceramic capacitor (MLCC) in general, a thermal treatment was applied at 800° C. As similar to Example 1, capacitance and ESR of the capacitors were measured, and for the capacitance, its mean value and standard deviation were calculated, In addition, the connection conductor layer (connection electrode 14) and the internal electrode layers 13 were cut by FIB, and as similar to the embodiments above, ten each of crystal grain size was measured at random. For the measurement, an area of the cross section of one crystal grain was converted to a diameter of circle equivalent, and this was implemented to cross sections of 10 crystal grains at random and an average was obtained, and each was deemed as the average grain size.

Comparative Example 4

A thin film capacitor was manufactured as similar to Example 1, and a Ni layer was made of Ni paste, which is normally used for IVILCC, as the connection conductor layer (connection electrode 14), and formed by a thermal treatment at the openings of the aggregate. Capacitance and ESR of the capacitors were measured as similar to Example 1, and for the capacitance, its mean value and standard deviation were calculated. In addition, the connection conductor layer (connection electrode 14) and the internal electrode layer 13 were cut by FIB, and 10 crystal grain sizes were measured at random as similar to the examples above. For the measurement, an area of the cross section of one crystal grain was converted to a diameter of circle equivalent, and this was implemented to cross sections of 10 crystal grains at random and average was obtained, and each was deemed as the average grain size.

Comparative Example 5

A thin film capacitor with the similar structure to FIG. 3 was manufactured as similar to example 10. Then, by matching with the paste thermal treatment temperature where the connection becomes certain at the laminated ceramic capacitor (MLCC) in general, a thermal treatment was applied at 800° C. Capacitance and ESR of the capacitors were measured as similar to Embodiment 1, and for the capacitance, its mean value and standard deviation were calculated. In addition, the connection conductor layer (connection electrode 14) and the internal electrode layer 13 were cut by FIB, and 10 each of crystal grain size was measured at random as similar to the embodiments above. For the measurement, an area of the cross section of one crystal grain was converted to a diameter of circle equivalent, and this was implemented to cross sections of 10 crystal grains at random and an average was obtained, and each was deemed as the average grain size.

For Examples 1 to 12 and Comparative Example 1 to 5, the average grain size 'D' of the internal electrodes, the average grain size 'd' of the connection electrodes. D/d values, mean values of capacitance, standard deviations and ESR are shown in Table 1.

TABLE 1

| | Average grain size of internal electrode D (nm) | Average grain size of connection electrode d (nm) | D/d (–) | Mean value of capacitance (nF) | Standard deviation of capacitance (nF) | ESR (mΩ) |
|---|---|---|---|---|---|---|
| Example 1 | 311 | 2 | 155.5 | 55.2 | 1 | 620 |
| Example 2 | 314 | 3.5 | 89.7 | 55.5 | 1.2 | 390 |
| Example 3 | 330 | 7 | 47.1 | 55 | 1.1 | 220 |
| Example 4 | 453 | 9 | 50.3 | 55.3 | 1.1 | 500 |
| Example 5 | 120 | 10 | 12.0 | 55.4 | 1.2 | 270 |
| Example 6 | 310 | 79 | 3.9 | 55.5 | 1 | 300 |
| Example 7 | 101 | 84 | 1.2 | 55.3 | 2 | 600 |
| Example 8 | 500 | 110 | 4.5 | 55.8 | 1 | 200 |
| Example 9 | 510 | 1 | 510.0 | 56 | 1 | 770 |
| Example 10 | 308 | 1 | 308.0 | 50.1 | 0.9 | 800 |
| Example 11 | 314 | 150 | 2.1 | 55.3 | 1.2 | 450 |
| Example 12 | 300 | 8 | 37.5 | 55 | 0.8 | 250 |
| Comparative Example 1 | 310 | 310 | 1.0 | 33 | 4.5 | 720 |
| Comparative Example 2 | 101 | 120 | 0.8 | 25.8 | 5 | 810 |
| Comparative Example 3 | 520 | 530 | 1.0 | 35 | 5.6 | 770 |
| Comparative Example 4 | 310 | 550 | 0.6 | 20.1 | 8.3 | 790 |
| Comparative Example 5 | 311 | 315 | 1.0 | 49.5 | 4.8 | 900 |

As shown in Table 1, a clear dependency can be confirmed in the average grain size, the mean capacitance and the standard deviation of the capacitance. In Examples 1 to 12, it was confirmed to have substantially the same capacitance as a design value (55 nF). The standard deviation of the capacitance is almost 1 nF, and the variation is small. This indicates that each laminated electrode is certainly connected. In the meantime, in the comparative examples, the capacitance is also considerably lower than the design value (55 nF), and the variation is also great. It was confirmed the comparative examples that the capacitance becomes smaller than the design value. Further, the standard deviation also becomes greater by 4 times or more compared to those in Examples 1 to 12. In other words, each laminated electrode is not certainly connected.

In other words, the thin film capacitors in the embodiments have more sufficient capacitance than those in the comparative examples, and the capacitance variation can also be smaller, and it was confirmed that the electrically-stable connection between the internal electrode layers and the connection electrode becomes possible.

For the relationship among the electric connectivity, the average grain size 'D' of the internal electrode layers 13 and the average grain size 'd' of the connection electrode 14, when D>d, it was confirmed that the capacitance becomes a substantially similar desired value as the design value, variation is also small and the certain connection is realized.

Next, evaluating ESR, it has become ascertained that the connectivity is reflected and ESR can be lowered to 500 mΩ within the range of 2≤D/d≤100. In addition, the resistance is further lowered within the range of 5≤D/d≤20 and 400 mΩ or less was obtained. The stability of the connectivity was confirmed.

In addition, in the thin film capacitors of the present invention, effects on the protruding distance L of the internal electrode layers are shown in Table 2. Table 2 shows protruding distance L, the average grain size 'D' of the internal electrodes, L/2d values, mean values and standard deviations of the capacitance and ESR for Examples Embodiments 13 to 22 above.

TABLE 2

| | Protruding distance L (nm) | Average grain size of internal electrode D (nm) | Average grain size of connection electrode d (nm) | L/2d (—) | Mean value of capacitance (nF) | Standard deviation of capacitance (nF) | ESR (mΩ) |
|---|---|---|---|---|---|---|---|
| Example 13 | 5 | 321 | 2 | 1.3 | 55.6 | 1 | 400 |
| Example 14 | 5 | 512 | 3 | 0.8 | 55 | 1 | 780 |
| Example 15 | 50 | 311 | 5 | 5.0 | 55.2 | 1 | 330 |
| Example 16 | 50 | 312 | 50 | 0.5 | 55.1 | 1.1 | 700 |
| Example 17 | 50 | 102 | 84 | 0.3 | 55.2 | 2 | 890 |
| Example 18 | 300 | 318 | 1 | 150.0 | 50.2 | 0.9 | 250 |
| Example 19 | 300 | 316 | 3.5 | 42.9 | 55.9 | 1.2 | 340 |
| Example 20 | 300 | 335 | 55 | 2.7 | 54.9 | 0.8 | 210 |
| Example 21 | 300 | 315 | 170 | 0.9 | 55.4 | 1.2 | 820 |
| Example 22 | 2000 | 503 | 110 | 9.1 | 55.7 | 1 | 320 |

As shown in Table 2, a clear dependency is confirmed in L/2d values and ESR. It becomes ascertained that it is possible to stabilize the connection and to especially lower ESR within the range of the protruding distance L/2d≥1.

What is claimed is:

1. A thin film capacitor, comprising:
a plurality of dielectric body layers and internal electrode layers that are alternately laminated on an under-electrode, a portion of each of the internal electrode layers being exposed from the dielectric body layer; and
a connection electrode to which at least a portion of the exposed portion of each of the internal electrode layers contact; wherein
a relationship between an average grain size D of sintered crystal grains in the internal electrode layers and an average grain size d of sintered crystal grains in the connection electrode is D>d, and
the relationship between the average sintered crystal grain size D and the average sintered crystal grain size d is 5≤D/d≤20.

2. The thin film capacitor according to claim 1, wherein
the exposed internal electrode layers include a protrusion part that protrudes from the dielectric body layer as seen in a lamination direction,
the connection electrode is electrically connected to the internal electrode layers via at least a portion of a surface of and an end surface of each of the internal electrode layers, the portion and the end being included in the protrusion part, and
the relationship between the length of the protrusion part L and the thickness of the protrusion part t is 0.5≤L/t≤120.

3. The thin film capacitor according to claim 1, wherein
the connection electrode includes at least an Ni region or an Ni alloy region, and
the relationship of the average grain size d of the crystal grains of the connection terminal in the region is D>d.

4. The thin film capacitor according to claim 1, wherein
the connection electrode includes at least an Ni region or an Ni alloy region, and
the relationship of the average grain size d of the sintered crystal grains of the connection terminal in the region is D>d.

5. The thin film capacitor according to claim 2, wherein
the connection electrode includes at least an Ni region or an Ni alloy region, and
the relationship of the average grain size d of the sintered crystal grains of the connection terminal in the region is D>d.

6. A method for manufacturing a thin capacitor, comprising:
forming a film of dielectric body layers and internal electrode layers using a mask to form a multilayer body on an under-electrode;
forming the internal electrode layers through using the mask so as to alternately move a film formation position at a predetermined amplitude per layer;
applying a thermal treatment to the dielectric body layers and the internal electrode layers;
performing a wet etching on a surface position at an opposite side of the under-electrode in the multilayer body so as to expose protrusion parts of the internal electrode layers and form openings;

forming a connection layer in the openings using a connection layer with an average sintered grain size in the internal electrode layers is equal to D, and an average sintered grain size in a connection electrode is equal to d, and the relationship between D and d is D>d;

molding the connection electrode within the openings;

forming a terminal electrode so as to connect to the connection electrode by seed film formation and plating treatment.

7. The method for manufacturing a thin capacitor in claim 6, further comprising:

forming a passivation film.

* * * * *